(12) United States Patent
Hamilton et al.

(10) Patent No.: US 11,780,409 B2
(45) Date of Patent: Oct. 10, 2023

(54) SENSOR APPARATUS WITH CLEANING

(71) Applicant: Ford Global Technologies, LLC, Dearborn, MI (US)

(72) Inventors: Tyler D. Hamilton, Farmington, MI (US); Michael Robertson, Jr., Garden City, MI (US); Rashaun Phinisee, Ypsilanti, MI (US); Kunal Singh, Farmington Hills, MI (US); Venkatesh Krishnan, Canton, MI (US); Raghuraman Surineedi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 16/986,586

(22) Filed: Aug. 6, 2020

(65) Prior Publication Data
US 2022/0041138 A1    Feb. 10, 2022

(51) Int. Cl.
| | | |
|---|---|---|
| *B60S 1/52* | (2006.01) | |
| *B60S 1/54* | (2006.01) | |
| *B60S 1/56* | (2006.01) | |
| *B60S 1/66* | (2006.01) | |
| *H04N 23/81* | (2023.01) | |
| *G01S 7/497* | (2006.01) | |

(52) U.S. Cl.
CPC .   *B60S 1/52* (2013.01); *B60S 1/54* (2013.01); *B60S 1/56* (2013.01); *B60S 1/66* (2013.01); *H04N 23/811* (2023.01); *G01S 7/497* (2013.01); *G01S 2007/4977* (2013.01)

(58) Field of Classification Search
CPC ............. G02B 27/0006; H04N 5/2171; G01D 11/245; G01S 7/4813
See application file for complete search history.

(56) References Cited

U.S. PATENT DOCUMENTS

| | | | | |
|---|---|---|---|---|
| 3,409,995 A | * | 11/1968 | Greenwood | ............ B60S 3/002 34/229 |
| 5,001,966 A | * | 3/1991 | McIntyre | .................. B60S 1/54 15/250.04 |
| 5,486,139 A | * | 1/1996 | Papp | ......................... B60S 1/54 15/313 |

(Continued)

FOREIGN PATENT DOCUMENTS

| | | | | |
|---|---|---|---|---|
| DE | | 10225151 A1 | * 12/2003 | ............ B60S 1/0848 |
| DE | | 102016101744 A1 | * 8/2017 | |

(Continued)

*Primary Examiner* — Spencer E. Bell
*Assistant Examiner* — Omair Chaudhri
(74) *Attorney, Agent, or Firm* — Frank A. MacKenzie; Bejin Bieneman PLC

(57) ABSTRACT

A sensor apparatus includes a housing attachable to a vehicle and including a panel, a sensor window, a liquid nozzle fixed relative to the housing, and a tunnel. The panel includes a port. The sensor window is positioned in the port. The liquid nozzle is aimed at the sensor window. The liquid nozzle is positioned in a first horizontal direction from the port along the panel. The tunnel extends along the panel and is positioned in a second horizontal direction from the port, the second horizontal direction being opposite the first horizontal direction. The tunnel terminates at an opening positioned to receive fluid outputted by the nozzle.

13 Claims, 4 Drawing Sheets

(56) References Cited

U.S. PATENT DOCUMENTS

| | | | | |
|---|---|---|---|---|
| 5,820,026 | A | * | 10/1998 | Raghu ............... B60S 1/52 239/589.1 |
| 5,868,867 | A | * | 2/1999 | Clukey ............ B60R 1/0602 15/301 |
| 10,766,464 | B2 | * | 9/2020 | Schmidt ............... B60S 1/62 |
| 2003/0155001 | A1 | * | 8/2003 | Hoetzer ............ B60S 1/0822 134/52 |
| 2011/0023915 | A1 | * | 2/2011 | McConnell ............ B60S 1/54 15/313 |
| 2012/0117745 | A1 | * | 5/2012 | Hattori ............... B60S 1/54 134/198 |
| 2013/0313334 | A1 | * | 11/2013 | McConnell ............ B60S 1/54 239/1 |
| 2014/0104426 | A1 | * | 4/2014 | Boegel ............... B60R 1/10 348/148 |
| 2015/0151722 | A1 | * | 6/2015 | Gokan ............ H04N 5/2251 134/198 |
| 2016/0375876 | A1 | * | 12/2016 | Silc ................ B60S 1/54 134/37 |
| 2017/0036647 | A1 | * | 2/2017 | Zhao ............ G02B 27/0006 |
| 2018/0361997 | A1 | * | 12/2018 | Schmidt ............ G02B 27/00 |
| 2019/0071058 | A1 | * | 3/2019 | Grasso ............... B60S 1/52 |
| 2019/0179140 | A1 | * | 6/2019 | Oba ............... H04N 5/2257 |
| 2019/0210570 | A1 | * | 7/2019 | Schmidt ............... B60S 1/56 |
| 2019/0310470 | A1 | * | 10/2019 | Weindorf ............ B60S 1/56 |
| 2020/0159010 | A1 | * | 5/2020 | Kuwae ............ G01S 7/4813 |
| 2021/0086727 | A1 | * | 3/2021 | Bopp ............... B08B 13/00 |
| 2021/0179030 | A1 | * | 6/2021 | Sakai ............... B60S 1/528 |
| 2021/0179031 | A1 | * | 6/2021 | Vitanov ............ H04N 23/811 |
| 2022/0126790 | A1 | * | 4/2022 | Matsunaga ............ B60S 1/54 |
| 2022/0266314 | A1 | * | 8/2022 | Min ............... G03B 17/08 |
| 2023/0132583 | A1 | * | 5/2023 | Matsunaga ............ B08B 5/02 239/598 |

FOREIGN PATENT DOCUMENTS

| | | | | |
|---|---|---|---|---|
| FR | 3086623 | A1 | * 4/2020 | ............ B60S 1/0848 |
| GB | 2360444 | A | * 9/2001 | ............ B60R 1/0602 |
| WO | WO-2018188822 | A1 | * 10/2018 | ............ B60S 1/48 |

* cited by examiner

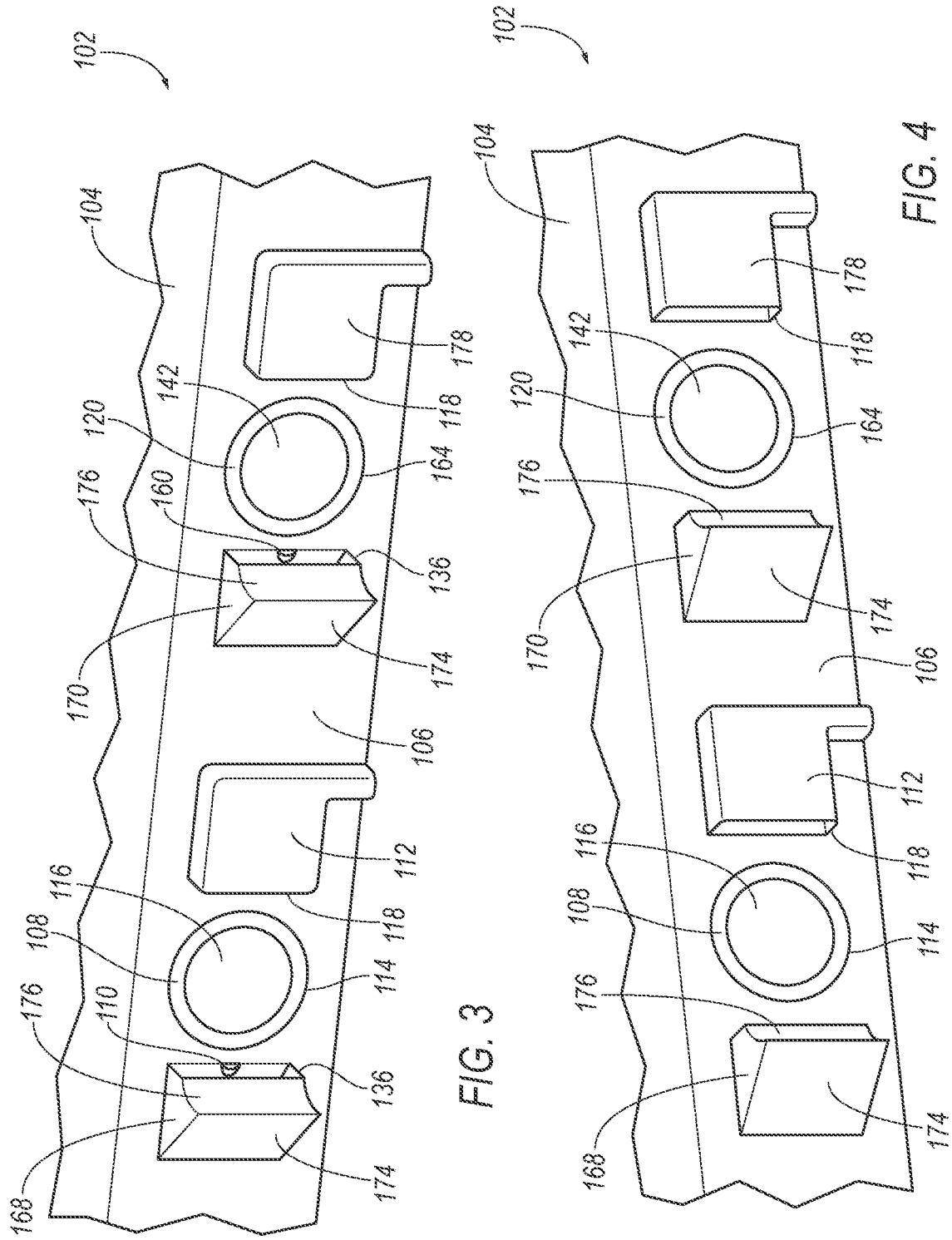

SENSOR APPARATUS WITH CLEANING

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

BRIEF DESCRIPTION OF THE DRAWINGS

FIG. 3 is a perspective view of a portion of the housing.

FIG. 4 is another perspective view of the portion of the housing.

DETAILED DESCRIPTION

Figure 1:
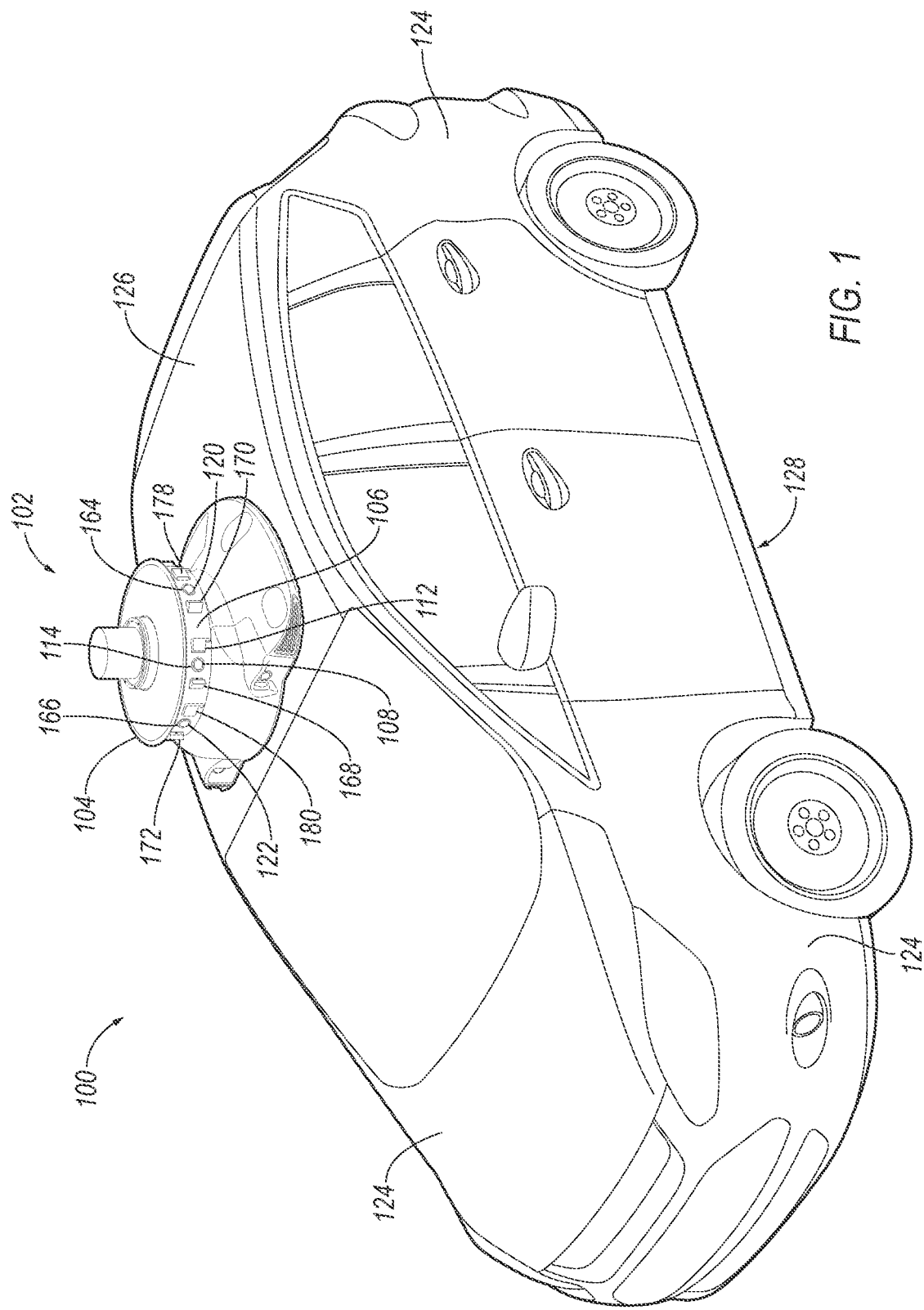
FIG. 1 is a perspective view of an example vehicle including a housing with sensors.

A sensor apparatus includes a housing attachable to a vehicle and including a panel, the panel including a port; a sensor window positioned in the port; a liquid nozzle fixed relative to the housing and aimed at the sensor window, the liquid nozzle positioned in a first horizontal direction from the port along the panel; and a tunnel extending along the panel and positioned in a second horizontal direction from the port, the second horizontal direction being opposite the first horizontal direction, the tunnel terminating at an opening positioned to receive fluid outputted by the liquid nozzle.

The panel may include an air deflector positioned in the first horizontal direction from the port. The air deflector may include a ramp oriented in the first horizontal direction.

The air deflector may include a concave surface oriented in the second horizontal direction. The concave surface may have a constant cross-section elongated transverse to the second horizontal direction.

The sensor apparatus may further include an air nozzle on the panel underneath the air deflector.

The air deflector may have a constant cross-section elongated vertically from above the port to below the port.

The sensor apparatus may further include an air nozzle on the panel and positioned in the first horizontal direction from the port. The liquid nozzle may be positioned in the air nozzle.

The air nozzle may be slot-shaped and elongated in a generally vertical direction.

The housing may include a pressurized chamber, and the air nozzle is open to the pressurized chamber. The sensor apparatus may further include a sensor including the sensor window, wherein the sensor is disposed in the pressurized chamber.

The port may be a first port, the sensor window may be a first sensor window, and the panel may include a second port; the sensor apparatus further comprising a second sensor window positioned in the second port; and the second port is positioned in the second horizontal direction from the first port. The tunnel may lead from the opening to below the second port.

The sensor apparatus may further include a first sensor including the first sensor window, a second sensor including the sensor window, and an air nozzle on the panel and positioned in the first horizontal direction from the first port, and the housing may include a pressurized chamber, the air nozzle may be open to the pressurized chamber, and the first and second sensors may be disposed in the pressurized chamber.

The sensor apparatus may further include a camera including the sensor window, wherein the sensor window is a lens.

With reference to the Figures, a sensor apparatus 102 includes a housing 104 attachable to a vehicle 100 and including a panel 106, a first sensor window 116, a first liquid nozzle 110 fixed relative to the housing 104, and a first tunnel 112. The panel 106 includes a first port 114. The first sensor window 116 is positioned in the first port 114. The first liquid nozzle 110 is aimed at the first sensor window 116. The first liquid nozzle 110 is positioned in a first horizontal direction from the first port 114 along the panel 106. The first tunnel 112 extends along the panel 106 and is positioned in a second horizontal direction from the first port 114, the second horizontal direction being opposite the first horizontal direction. The first tunnel 112 terminates at an opening 118 positioned to receive fluid outputted by the first liquid nozzle 110.

The first tunnel 112 can capture spray from the first liquid nozzle 110. The first tunnel 112 can prevent the spray from landing on, e.g., a second sensor 120 of the vehicle 100, other vehicles in the vicinity, etc. A first sensor 108 including the first sensor window 116 can be cleaned while keeping the second sensor 120 free from interference from the cleaning.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. A vehicle computer can be programmed to operate the vehicle 100 independently of the intervention of a human driver, completely or to a lesser degree. The vehicle computer may be programmed to operate a propulsion, brake system, steering, and/or other vehicle systems based at least in part on data received from the first sensor 108 and the second sensor 120, as well as other sensors 122. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 100 includes a body 128. The vehicle 100 may be of a unibody construction, in which a frame and the body 128 of the vehicle 100 are a single component. The vehicle 100 may, alternatively, be of a body-on-frame construction, in which the frame supports the body 128 that is a separate component from the frame. The frame and body 128 may be formed of any suitable material, for example, steel, aluminum, etc. The body 128 includes body panels 124 partially defining an exterior of the vehicle 100. The body panels 124 may present a class-A surface, e.g., a finished surface exposed to view by a customer and free of unaesthetic blemishes and defects. The body panels 124 include, e.g., a roof 126, etc.

The housing 104 for the first sensor 108, the second sensor 120, and the other sensors 122 is attachable to one of the body panels 124 of the vehicle 100, e.g., the roof 126. For example, the housing 104 may be shaped to be attachable to the roof 126, e.g., may have a shape matching a contour of the roof 126. The housing 104 may be attached to the roof 126, which can provide the first sensor 108, the second sensor 120, and the other sensors 122 with an unobstructed field of view of an area around the vehicle 100. The housing 104 may be formed of, e.g., plastic or metal.

The housing 104 includes the panel 106. The panel 106 extends vertically and constitutes a side wall of the housing 104. The panel 106 can extend partially or completely around the housing 104.

Figure 2:
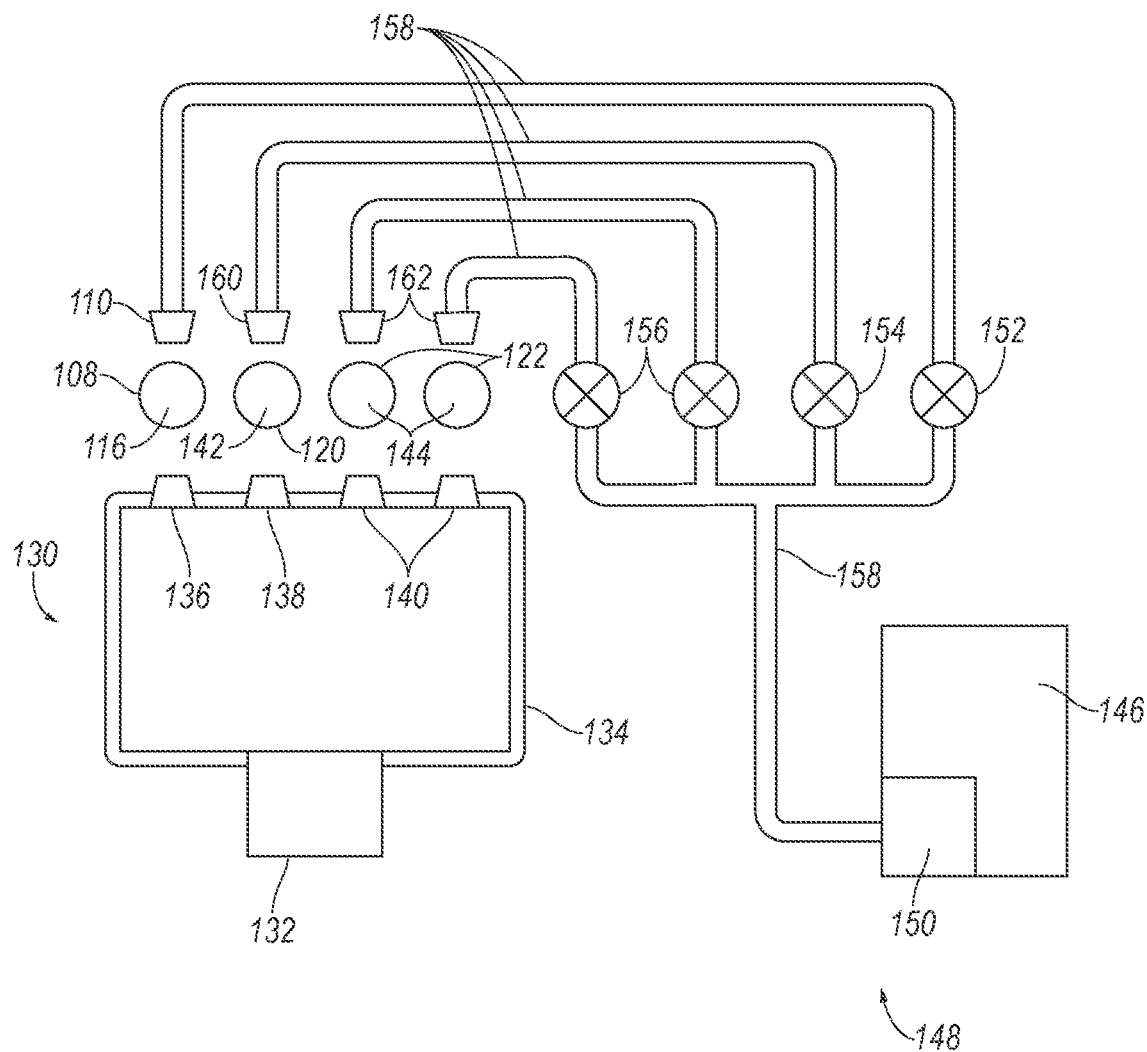
FIG. 2 is a diagram of an example cleaning system for the sensors.

With reference to FIG. 2, the sensor apparatus 102 includes an air cleaning system 130. The air cleaning system 130 includes a pressure source 132, a pressurized chamber 134, a first air nozzle 136, a second air nozzle 138, and other air nozzles 140. The pressure source 132 is fluidly connected via the pressurized chamber 134 to the first air nozzle 136, the second air nozzle 138, and the other air nozzles 140.

The pressure source 132 increases the pressure of a gas occupying the pressurized chamber 134. For example, the pressure source 132 may be a blower, which may force additional gas into a constant volume. The pressure source 132 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type. Alternatively to the pressure source 132 being a blower, the sensor apparatus 102 may pressurize the pressurized chamber 134 of the housing 104 in other ways. For example, forward motion of the vehicle 100 may force air through passageways leading to the pressurized chamber 134.

Figure 5:
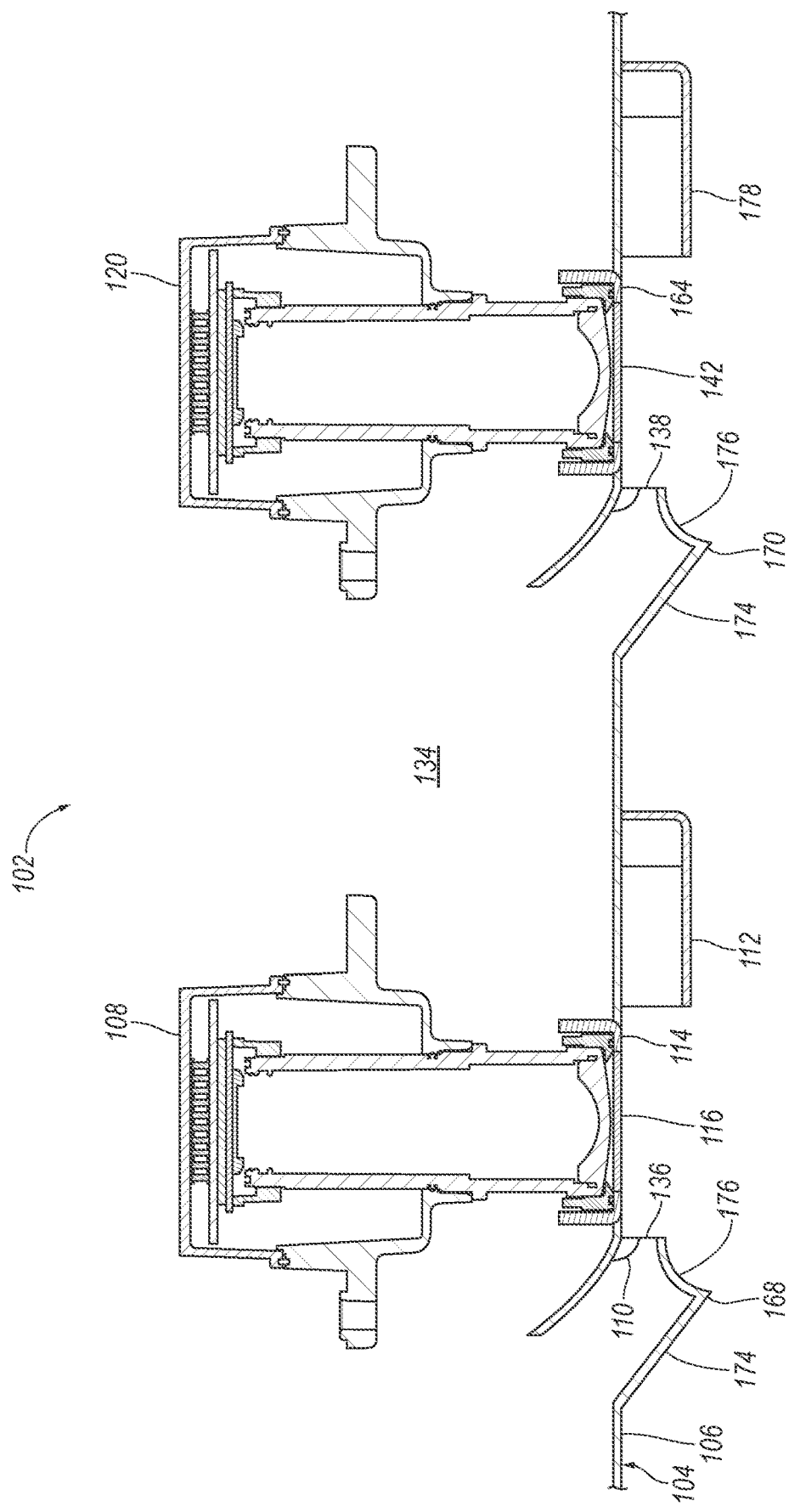
FIG. 5 is a cross-sectional top view of the portion of the housing.

The housing 104 includes the pressurized chamber 134. The panel 106 partially forms the pressurized chamber 134 (as shown in FIG. 5). The pressurized chamber 134 is positioned to receive airflow from the pressure source 132. The pressurized chamber 134 may be sealed other than to receive airflow from the pressure source 132 and to expel airflow at the air nozzles 136, 138, 140.

The first air nozzle 136, the second air nozzle 138, and the other air nozzles 140 are open to the pressurized chamber 134. As described in more detail below, the air nozzles 136, 138, 140 are shaped to guide airflow from the pressurized chamber 134, which has higher-than-atmospheric pressure, into air curtains. The first air nozzle 136 generates an air curtain across the first sensor window 116 of the first sensor 108; the second air nozzle 138 generates an air curtain across a second sensor window 142 of the second sensor 120; and the other air nozzles 140 generate air curtains across respective other sensor windows 144 of the other sensors 122.

In operation, the pressure source 132 draws in air from the ambient environment and directs the air to the pressurized chamber 134. The pressure source 132 causes the pressure of the pressurized chamber 134 to increase above the atmospheric pressure outside the housing 104. The increased pressure forces air through the air nozzles 136, 138, 140. The shapes of the air nozzles 136, 138, 140 causes the airflow to form air curtains across the respective sensor windows 116, 142, 144 of the respective sensors 108, 120, 122. The air curtains can remove debris from the sensor windows 116, 142, 144 as well as prevent debris from contacting the sensor windows 116, 142, 144.

The sensor apparatus 102 includes a liquid cleaning system 148. The liquid cleaning system 148 includes a reservoir 146, a pump 150, a first valve 152, a second valve 154, other valves 156, liquid supply lines 158, the first liquid nozzle 110, a second liquid nozzle 160, and other liquid nozzles 162. The reservoir 146, the pump 150, the valves 152, 154, 156, and the liquid nozzles 110, 160, 162 are fluidly connected to each other (i.e., fluid can flow from one to the other). The liquid cleaning system 148 distributes washer fluid stored in the reservoir 146 to the liquid nozzles 110, 160, 162. "Washer fluid" is any liquid stored in the reservoir 146 for cleaning. The washer fluid may include solvents, detergents, diluents such as water, etc.

The reservoir 146 may be a tank fillable with liquid, e.g., washer fluid for window cleaning. The reservoir 146 may be disposed in the housing 104, e.g., in the pressurized chamber 134, or at a front of the vehicle 100, e.g., in an engine compartment forward of a passenger cabin. The reservoir 146 may store the washer fluid only for supplying the sensor apparatus 102 or also for other purposes, such as supply to a windshield.

The pump 150 may force the washer fluid through the liquid supply lines 158 to the liquid nozzles 110, 160, 162 with sufficient pressure that the washer fluid sprays from the liquid nozzles 110, 160, 162. The pump 150 is fluidly connected to the reservoir 146. The pump 150 may be attached to or disposed in the reservoir 146.

The first valve 152 is positioned and operable to control fluid flow from the pump 150 to the first liquid nozzle 110; the second valve 154 is positioned and operable to control fluid flow from the pump 150 to the second liquid nozzle 160; and each other valve 156 is positioned and operable to control fluid flow from the pump 150 to one of the other liquid nozzles 162. Specifically, fluid from the liquid supply line 158 from the pump 150 must flow through one of the valves 152, 154, 156 to reach the respective liquid supply line 158 providing fluid to the respective liquid nozzle 110, 160, 162. The valves 152, 154, 156 control flow by being actuatable between an open position permitting flow and a closed position blocking flow from the incoming to the outgoing of the liquid supply lines 158. The valves 152, 154, 156 can be solenoid valves. As a solenoid valve, each valve 152, 154, 156 includes a solenoid and a plunger. Electrical current through the solenoid generates a magnetic field, and the plunger moves in response to changes in the magnetic field. The solenoid moves the plunger between a position in which the valve 152, 154, 156 is open and a position in which the valve 152, 154, 156 is closed.

The liquid supply lines 158 extend from the pump 150 to the valves 152, 154, 156 and from each valve 152, 154, 156 to the respective liquid nozzle 110, 160, 162. The liquid supply lines 158 may be, e.g., flexible tubes.

The first liquid nozzle 110 is positioned to receive fluid from the first valve 152 via the respective liquid supply line 158; the second liquid nozzle 160 is positioned to receive fluid from the second valve 154 via the respective liquid supply line 158; and the other valves 156 are positioned to receive fluid from the respective other valves 156 via the respective liquid supply lines 158. The first liquid nozzle 110 is aimed at the first sensor window 116; the second liquid nozzle 160 is aimed at the second sensor window 142; and the other liquid nozzles 162 are aimed at the respective other sensor windows 144.

With reference to FIGS. 3-5, the panel 106 includes the first port 114, a second port 164, and other ports 166. The ports 114, 164, 166 are circular in shape. The ports 114, 164, 166 are positioned horizontally from each other. The second port 164 is positioned in a second horizontal direction from the first port 114, and the second horizontal direction is opposite the first horizontal direction. For example, the first horizontal direction can be a vehicle-forward direction, and the second horizontal direction can be a vehicle-rearward direction.

The sensors 108, 120, 122 may detect the external world, e.g., objects and/or characteristics of surroundings of the vehicle 100, such as other vehicles, road lane markings, traffic lights and/or signs, pedestrians, etc. For example, the sensors 108, 120, 122 may be optical sensors such as radar sensors, scanning laser range finders, light detection and ranging (LIDAR) devices, or image processing sensors such as cameras. Specifically, the sensors 108, 120, 122 can be cameras, which can detect electromagnetic radiation in some range of wavelengths. For example, the cameras may detect visible light, infrared radiation, ultraviolet light, or some range of wavelengths including visible, infrared, and/or ultraviolet light. For another example, the cameras may be a time-of-flight (TOF) cameras, which include a modulated light source for illuminating the environment and detect both reflected light from the modulated light source and ambient light to sense reflectivity amplitudes and distances to the scene. The sensor windows 116, 142, 144 can be lenses for the respective sensors 108, 120, 122.

The first sensor 108, second sensor 120, and other sensors 122 may be arranged to collectively cover a 360° field of view with respect to a horizontal plane. The sensors are fixed relative to the housing 104 inside the housing 104, e.g., inside the pressurized chamber 134. The sensors 108, 120, 122 are fixedly attached directly or indirectly to the housing 104. The sensors 108, 120, 122 are positioned in the respective ports 114, 164, 166. For example, each port 114, 164, 166 may be concentric around the respective sensor window 116, 142, 144 of the respective sensor 108, 120, 122. The first sensor 108 has a field of view through the first sensor window 116 and the first port 114; the second sensor 120 has a field of view through the second sensor window 142 and the second port 164; and each other sensor 122 has a field of view through the respective other sensor window 144 and respective other port 166. The field of view of one of the sensors 108, 120, 122 may overlap the fields of view of the sensors 108, 120, 122 that are circumferentially adjacent to one another, i.e., that are immediately next to each other, including the fields of view of the first sensor 108 and second sensor 120.

The panel 106 includes a first air deflector 168, a second air deflector 170, and other air deflectors 172. The first air deflector 168 is positioned in the first horizontal direction from the first port 114, e.g., in a vehicle-forward direction from the first port 114 if the first port 114 and second port 164 are on a lateral side of the housing 104, or in a vehicle-leftward direction from the first port 114 if the first port 114 and second port 164 are on a front side of the housing 104. The first horizontal direction is a direction upstream relative to the first liquid nozzle 110, and the second horizontal direction is a direction downstream relative to the first liquid nozzle 110. The second air deflector 170 is positioned in the first horizontal direction from the second port 164, and the other air deflectors 172 are positioned in the first horizontal direction from the respective other ports 166. The first air deflector 168, second air deflector 170, and other air deflectors 172 are at a same height as the first port 114, second port 164, and other ports 166.

Each air deflector 168, 170, 172 includes a ramp 174 oriented in the first horizontal direction, i.e., away from the respective port 116, 164, 166, and a concave surface 176 oriented in the second horizontal direction, i.e., toward the respective port 116, 164, 166. Each air deflector 168, 170, 172 has a constant cross-section elongated transverse to the second horizontal direction, e.g., vertically, from above the respective port 116, 164, 166 to below the respective port 116, 164, 166. The ramps 174 and concave surfaces 176 are elongated from below the respective port 116, 164, 166 to above the respective port 116, 164, 166. The ramps 174 are generally flat. The concave surfaces 176 are curved horizontally and elongated straight up and down. The ramps 174 are shaped to deflect oncoming airflow and contaminants away from the respective sensor window 116, 142, 144 when the respective port 114, 164, 166 is on a lateral side of the housing 104. The concave surfaces 176 are shaped to direct oncoming airflow into an air curtain across the respective sensor window 116, 142, 144 when the respective port 114, 164, 166 is on a front side of the housing 104.

The first air nozzle 136, the second air nozzle 138, and the other air nozzles 140 are positioned on the panel 106. The first air nozzle 136 is positioned in the first horizontal direction from the first port 114; the second air nozzle 138 is positioned in the first horizontal direction from the second port 164; and the other air nozzles 140 are positioned in the first horizontal direction from the respective other ports 166. The first air nozzle 136 is oriented to output air across the first sensor window 116; the second air nozzle 138 is oriented to output air across the second sensor window 142; and the other air nozzles 140 are oriented to output air across the respective other sensor windows 144.

The first air nozzle 136 is positioned underneath the first air deflector 168; the second air nozzle 138 is positioned underneath the second air deflector 170; and the other air nozzles 140 are positioned underneath the respective other air deflectors 172. Specifically, the air nozzles are positioned underneath the respective concave surfaces 176. The air nozzles 136, 138, 140 are formed of the panel 106 and the air deflectors 168, 170, 172, specifically the concave surfaces 176.

Each air nozzle 136, 138, 140 is slot-shaped and elongated in a generally vertical direction. Each air nozzle 136, 138, 140 has a constant cross-section elongated transverse to the second horizontal direction, e.g., vertically, from above the respective port 114, 164, 166 to below the respective port 114, 164, 166. The air nozzles 136, 138, 140 are elongated from below the respective port 114, 164, 166 to above the respective port 114, 164, 166.

The first liquid nozzle 110, the second liquid nozzle 160, and the other liquid nozzles 162 are positioned on the panel 106. The first liquid nozzle 110 is positioned in the first horizontal direction from the first port 114 along the panel 106; the second liquid nozzle 160 is positioned in the first horizontal direction from the second port 164 along the panel 106; and the other liquid nozzles 162 are positioned in the first horizontal direction from the respective other ports 166 along the panel 106. The first liquid nozzle 110 is positioned in the first air nozzle 136; the second liquid nozzle 160 is positioned in the second air nozzle 138; and the other liquid nozzles 162 are positioned in the respective other air nozzles 140. The first liquid nozzle 110 is aimed at the first sensor window 116; the second liquid nozzle 160 is aimed at the second sensor window 142; and the other liquid nozzles 162 are aimed at the respective other sensor 122 windows.

The first tunnel 112 is positioned on the panel 106 in the second horizontal direction from the first port 114; a second tunnel 178 is positioned on the panel 106 in the second horizontal direction from the second port 164; and other tunnels 180 are positioned on the panel 106 in the second horizontal direction from the respective other ports 166. Each tunnel 112, 178, 180 terminates at an opening 118 positioned to receive fluid outputted by the respective liquid nozzle 110, 160, 162. Each opening 118 extends from above the respective port 114, 164, 166 to below the respective port 114, 164, 166. Each tunnel 112, 178, 180 is extended along the panel 106 and leads from the respective opening 118 to below the first port 114 and second port 164. The first tunnel 112 captures a significant proportion of the fluid outputted by the first liquid nozzle 110, which can prevent that fluid from landing on the second sensor window 142. The second tunnel 178 captures a significant proportion of the fluid outputted by the second liquid nozzle 160, which can prevent that fluid from landing on one of the other sensor windows 144. The tunnels 112, 178, 180 are shaped to bring the captured fluid below the ports 114, 170, 172 so that the fluid can drain without obscuring any of the sensors 108, 120, 122.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor apparatus comprising:
  a housing attachable to a vehicle and including a panel, the panel including a first port and a second port, the second port being positioned in a second horizontal direction from the first port, the second horizontal direction being downstream with respect to windflow generated by forward motion of the vehicle including the sensor apparatus;
  a first sensor window positioned in the first port;
  a second sensor window positioned in the second port;
  a liquid nozzle fixed relative to the housing and aimed at the first sensor window, the liquid nozzle positioned in a first horizontal direction from the first port along the panel;
  a tunnel extending along the panel and positioned in the second horizontal direction from the first port, the second horizontal direction being opposite the first horizontal direction, the tunnel terminating at an opening extending outward from the panel and positioned to receive fluid outputted by the liquid nozzle; and
  an air deflector on the panel and positioned in the first horizontal direction from the first port, wherein the air deflector includes an air nozzle, and the liquid nozzle is positioned inside a flow passage of the air nozzle;
  wherein the second sensor window is positioned to receive airborne fluid outputted by the liquid nozzle that is carried by the windflow generated by forward motion of the vehicle;
  the opening is positioned to prevent the airborne fluid outputted by the liquid nozzle from reaching the second window;
  the air deflector includes a top surface having a first portion and a second portion;
  the first portion is a ramp; and
  the second portion is a concave surface curving inwardly toward the flow passage of the air nozzle and extending from the first portion to an outlet of the air nozzle.

2. The sensor apparatus of claim 1, wherein the ramp is oriented in the first horizontal direction.

3. The sensor apparatus of claim 2, wherein the air deflector includes a concave surface oriented in the second horizontal direction.

4. The sensor apparatus of claim 3, wherein the concave surface has a constant cross-sectional shape projected transverse to the second horizontal direction.

5. The sensor apparatus of claim 1, wherein the air nozzle on the panel is underneath the air deflector.

6. The sensor apparatus of claim 1, wherein the air deflector has a constant cross-sectional shape projected vertically from above the first port to below the first port.

7. The sensor apparatus of claim 1, wherein the liquid nozzle is positioned inside the outlet of the air nozzle.

8. The sensor apparatus of claim 1, wherein the air nozzle is slot-shaped and elongated in a generally vertical direction.

9. The sensor apparatus of claim 1, wherein the housing includes a pressurized chamber, and the air nozzle is open to the pressurized chamber.

10. The sensor apparatus of claim 9, further comprising a sensor including the first sensor window, wherein the sensor is disposed in the pressurized chamber.

11. The sensor apparatus of claim 1, wherein the tunnel leads from the opening to below the second port.

12. The sensor apparatus of claim 1, further comprising a first sensor including the first sensor window, and a second sensor including the second sensor window, wherein the housing includes a pressurized chamber, the air nozzle is open to the pressurized chamber, and the first and second sensors are disposed in the pressurized chamber.

13. The sensor apparatus of claim 1, further comprising a camera including the first sensor window, wherein the first sensor window is a lens.

\* \* \* \* \*